(12) United States Patent
Anderson (10) Patent No.: US 7,315,908 B2
(45) Date of Patent: Jan. 1, 2008

(54) COMPUTER AND RFID-BASED INPUT DEVICES

(75) Inventor: Glen Anderson, Sioux City, IA (US)

(73) Assignee: Gateway Inc., Irvine, CA (US)

( * ) Notice: Subject to any disclaimer, the term of this patent is extended or adjusted under 35 U.S.C. 154(b) by 481 days.

(21) Appl. No.: 10/821,332

(22) Filed: Apr. 9, 2004

(65) Prior Publication Data

US 2005/0237295 A1    Oct. 27, 2005

(51) Int. Cl.
*G01S 13/00* (2006.01)
*G06F 13/00* (2006.01)

(52) U.S. Cl. ............................ 710/62; 710/72; 342/42; 340/10.1

(58) Field of Classification Search ............ 710/62–64, 710/72–74; 342/42, 44, 46, 50–51; 340/10.1–10.3
See application file for complete search history.

(56) References Cited

U.S. PATENT DOCUMENTS

| 6,285,295 | B1 | 9/2001 | Casden | |
|---|---|---|---|---|
| 6,634,560 | B1 * | 10/2003 | Grabau | 235/492 |
| 6,828,902 | B2 * | 12/2004 | Casden | 340/10.3 |
| 6,903,662 | B2 * | 6/2005 | Rix et al. | 341/22 |
| 6,978,118 | B2 * | 12/2005 | Vesikivi et al. | 455/41.1 |

* cited by examiner

*Primary Examiner*—Christopher Shin
(74) *Attorney, Agent, or Firm*—Jeffrey A. Proehl; Woods Fuller Shultz & Smith (57) ABSTRACT

A computer has at least one input device. The input device includes at least one RF transponder that is configured as part of an RFID device, the at least one RF transponder being controllable by a user to be selectively capable or incapable of transmitting a signal. The computer also includes a computing arrangement including a reader and a microprocessor, the computing arrangement being adapted to receive and decode the signal from the at least one RF transponder.

34 Claims, 5 Drawing Sheets

COMPUTER AND RFID-BASED INPUT DEVICES

BACKGROUND AND SUMMARY

The present invention relates to computers and input devices therefore and, more particularly, to computers and Radio Frequency Identification-based input devices.

Radio Frequency Identification (RFID) is a technique of automatic identification that has been gaining popularity over the past several years. It has been of particular interest for its potential in inventory control and analogous data handling processes.

As explained in *Radio Frequency Identification—RFID, A Basic Primer*, AIM WP-98/002R, The Association for Automatic Identification and Data Capture Technologies (http://www.aimglobal.org/technologies/rfid/resources/papers/rfid_basics_primer.htm), which is incorporated by reference, in an RFID system, data is carried in transponders (derived from TRANSmitter/resPONDER), also referred to as "tags". The data may provide for identification of an item in manufacture, goods in transit, a location, the identity of a vehicle, an animal, or an individual. The data on the transponders can be entered by the manufacturer or, in some cases, can be entered at a point remote from the manufacturer. A reader for reading the transponders and some means of communicating the data to a host computer is also provided.

Communication between the transponder and the reader is wireless and generally occurs either by inductive coupling or by propagating electromagnetic waves. Generally, the transponder is made as a lower power integrated circuit suitable for interfacing to external coils or utilizing "coil-on-chip" technology, for data transfer and power generation. Depending upon the sophistication of the device, the transponder will include a memory that may be in the form of a read-only memory, a random access memory, or non-volatile programmable memory. The transponder may be "active" and be powered by a power source such as a battery, or "passive" with no internal power source. The transponder includes an antenna that permits the transponder to sense an interrogating field from the reader and, in some circumstances, a programming field, and also serves as the means for transmitting the transponder response to interrogation.

As explained in U.S. Pat. No. 6,285,295, which is incorporated by reference, in operation, a reader will generate a radio frequency. When the integrated circuit is within the field of the reader, energy to activate the integrated circuit is obtained via induction. The energized integrated circuit loads an antenna circuit of the transponder according to a program of the integrated circuit. The loading of the transponder antenna is detected as a pattern of voltage changes on the reader's antenna circuit. The changes are converted into logical data bits using standard decoding methods and the data is then interpreted by the host computer.

U.S. Pat. No. 6,285,295 discloses a passive remote programmer for induction type RFID readers. Keys on a keypad are associated with different switches and integrated circuits, each integrated circuit being programmed to transmit a unique identification code when activated by a field of the reader. Closing any one of the switches connects a corresponding one of the integrated circuits to an antenna coil to produce a unique tag. The reader is programmed to identify the tags. For the reader to recognize the keypad and permit programming of the reader, the keypad must be proximate the reader and a unique key on the keypad must be actuated. Other tags such as might be provided in a card-type of tag are also provided but require only proximity to the reader.

According to an aspect of the present invention, a computer having at least one input device includes an input device including at least one RF transponder that is controllable by a user to be selectively capable or incapable of transmitting a signal. The computer also includes a computing arrangement including a reader and a microprocessor, the computing arrangement being adapted to receive and decode the signal from the at least one RF transponder. The computer includes a display adapted to display information represented by the signal.

According to another aspect of the present invention, a computer having at least one input device includes an input device including at least one RF transponder that is configured as part of an RFID device, the at least one RF transponder being controllable by a user to be selectively capable or incapable of transmitting a signal. The computer also includes a computing arrangement including a reader and a microprocessor, the computing arrangement being adapted to receive and decode the signal from the at least one RF transponder. The input device includes a pointing device.

According to yet another aspect of the present invention, a computer input device includes an input device including at least one RF transponder that is configured as part of an RFID device, the at least one RF transponder being controllable by a user to be selectively capable or incapable of transmitting a signal. The input device is adapted to cooperate with a computing arrangement including a reader and a microprocessor, the computing arrangement being adapted to receive and decode the signal from the at least one RF transponder. The input device includes a pointing device.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
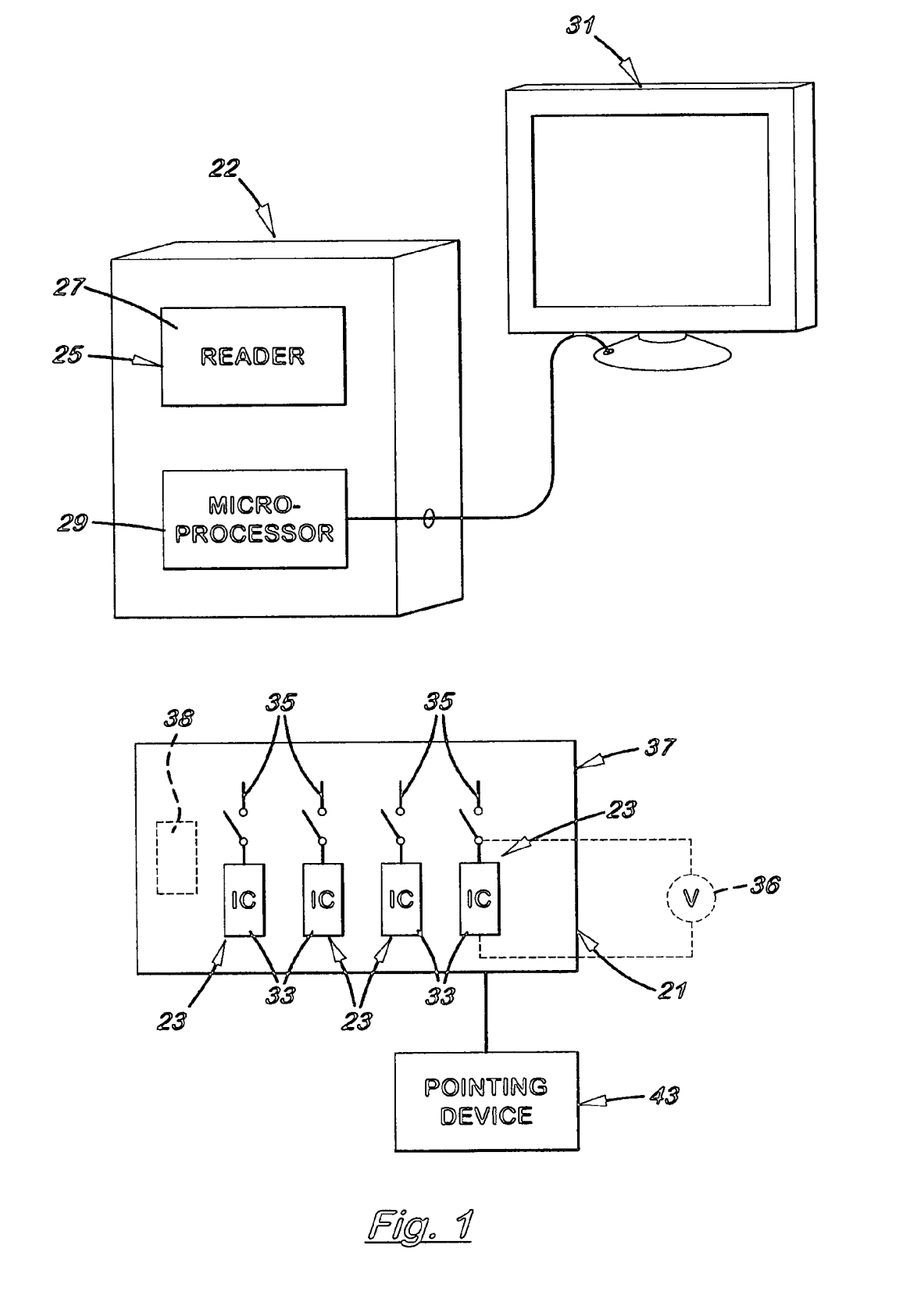
FIG. 1 is a perspective view of a computer according to an embodiment of the present invention.

A computer input device 21 according to an embodiment of the present invention is shown in FIG. 1. The input device 21 is usable with a computer 22, which may be broadly defined as including, but not limited to, personal computers such as desk top and lap top computers, and other processing devices.

The input device 21 includes at least one and ordinarily a plurality of RF transponders 23 that are configured as part of an RFID device, the at least one RF transponder being controllable by a user to be selectively capable or incapable of transmitting a signal. According to an embodiment of the invention, the input device 21 is adapted to cooperate with a computing arrangement 25 including a reader 27 and a microprocessor 29, the computing arrangement being adapted to receive and decode the signal from the RF transponders 23. The input device 21 may be any one of a number of different types of input devices such as keypad-type devices such as computer keyboards and pointing-type devices such as mice, trackballs, touchpads, joysticks, and graphics tablets. The foregoing examples are merely illustrative. For example, the reader 27 may be housed in a traditional computer housing or may be attached to the computer 22 by, for example, USB connections. The reader 27 may, for example, be housed in a keyboard that is connected to a computer by a USB connection. The keyboard may have an internal controller capable of converting the RFID input from another peripheral device such as a mouse into a USB format and this input is then sent to the computer via a USB connection.

A display 31 may be provided, the display being adapted to display information represented by the signal. A display 31 in the sense used here includes substantially any device capable of graphically representing the information represented by the signal and includes, for example, computer monitors, PDA screens, and printers.

Figure 2:
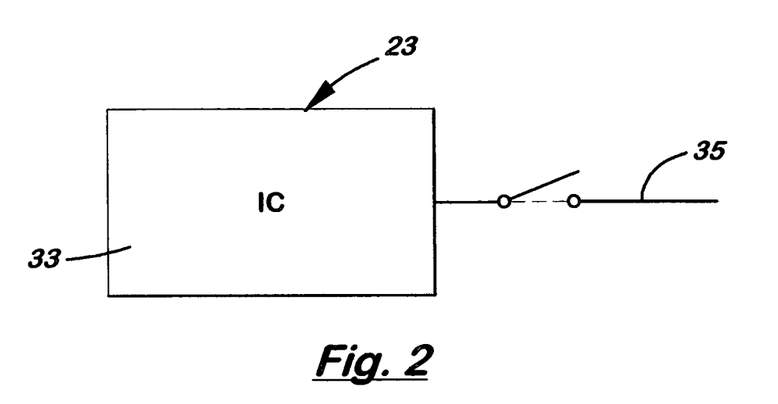
FIG. 2 schematically shows an RFID device according to an embodiment of the present invention.
Figure 3:
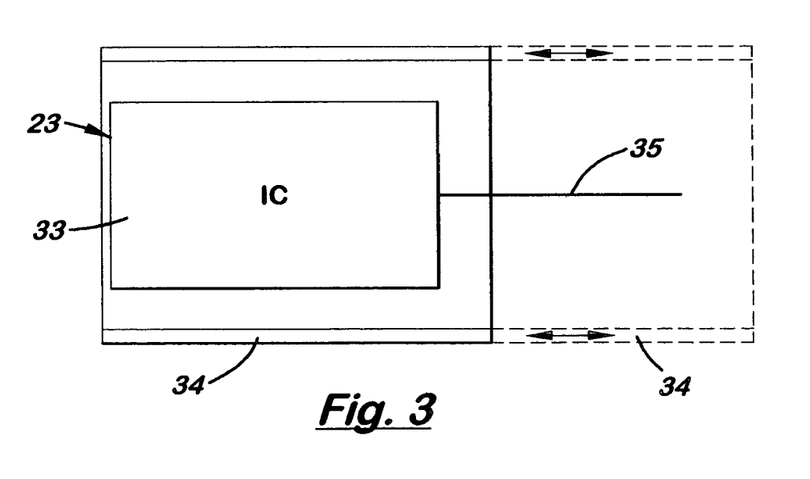
FIG. 3 schematically shows an RFID device according to another embodiment of the present invention.

The RF transponders 23 may be controlled to be selectively capable and incapable of transmitting signals in a number of different ways. For example, as seen in FIG. 2, the transponders 23 may be made capable or incapable of transmitting a signal by connecting or disconnecting an integrated circuit 33 and an antenna 35. Another way of controlling transponder 23 to be capable or incapable of transmitting the signal is by exposing or shielding an antenna 35 such as by moving a shield 34 relative to the antenna as seen in FIG. 3. Except where otherwise noted, the present invention is described generally in terms of transponders 23 of the type shown in FIG. 2, it being understood that the invention can be adapted to use other forms of transponders, such as those of the type shown in FIG. 3.

While the input device 21 described in the present application does not require a power source, a power source 36 (shown in phantom) can be provided if desired. The use of a power source will ordinarily permit the distance between the input device and the computing arrangement 25 to be increased compared to embodiments wherein there is no power source. The input device 21 may switch to a wireless mode when the internal power source runs out. The receiving system can ignore the wireless input until a powered signal from the input device is no longer received, or the input device may have a circuit that enables the input when the input device has no power.

Figure 4:
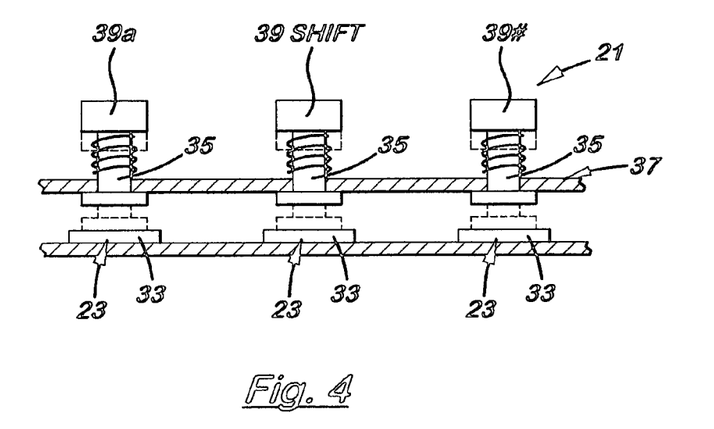
FIG. 4 schematically shows a keypad-type input device according to an embodiment of the present invention.

In the embodiment of the invention seen in FIG. 1, the input device 21 can include a keypad 37 having a plurality of keys as seen in FIG. 4. The keypad 37, when configured like a conventional keyboard, can be set up to function substantially the same as a conventional keyboard. Additionally, the computing arrangement 25 can, if desired, be set up to operate either wirelessly, as described in the present application, or using conventional wired input devices in the conventional manner, such as with a microcontroller and USB or PS/2 connections, at the discretion of the user. For example, the input device 21 can be provided with ports 38 (shown in phantom) for connection of USB or PS/2 connections. The keypad may, of course, be mounted on a chassis of a computing arrangement and may be removable from the chassis. The keypad may be adapted to operate wirelessly when the keyboard is removed from the chassis.

As seen in FIG. 4, the keypad 37 can be arranged such that, when one of the plurality of keys 39 is depressed, an antenna 35 is caused to connect with a corresponding integrated circuit 33 and send a signal. When connected to an antenna 35, each integrated circuit 33 sends a unique signal that is received and decoded by the computing arrangement 25. For example, depression of one key 39a causes an antenna 35 to contact an integrated circuit 33a that transmits a signal that is received by the computing arrangement 25, decoded, and displayed on the display as the lower case letter "a".

Depression of selected combinations of keys 39 simultaneously sends a different signal than depression of the same keys individually. For example, depression of the key 39a displays as the letter "a" and the subsequent depression of the key 39 shift does not result in a display. Depression of the key 39a simultaneously with depression of the key 39 shift transmits signals that are received and decoded by the computer arrangement 25 and displayed on the display 31 as the upper case letter "A".

The computing arrangement 25 can also be arranged such that depression of a selected sequence of keys 39 within a predetermined period of time is decoded differently than if the sequence of keys is not depressed within the predetermined period of time. For example, depressing the key 39a followed within the predetermined period of time by depressing the key 39# can be decoded by the computing arrangement 25 to cause a particular output, such as the display of a pre-programmed name, for example, "Bob Smith". If the keys are not depressed within the predetermined period of time, depression of the keys 39a and 39# can produce a display of "a" and "#".

Additionally, the computer 22 can be arranged so that certain status information can be displayed on the display 31. For example, because the input device 21 does not need to have a power source, when the input device is in the form of a computer keyboard, status information such as "Caps Lock", "Num Lock", or "Scroll Lock" that might ordinarily be detected by lights on a conventional keyboard can, instead, be displayed in some fashion, such as in a toolbar, on the display 31.

The input device 21 can also operate together with another RFID product. For example, the computing arrangement 25 can be adapted to receive and decode the signal from the RF transponders 23 only when the computing arrangement detects the presence of an authorized RFID tag, which might be provided on a user ID card. The input device 21 may be a combination of different forms of input devices, such as a combined keyboard and a pointing stick or trackball.

The input device 21 may also include a pointing device 43, either by itself, with other pointing devices, or with a keypad 37 as seen in FIG. 1. The expression pointing device is intended to cover the gamut of devices including, but not limited to, mice, joysticks, pointing sticks, touchpads, trackballs, and graphics tablets.

Figure 5A:
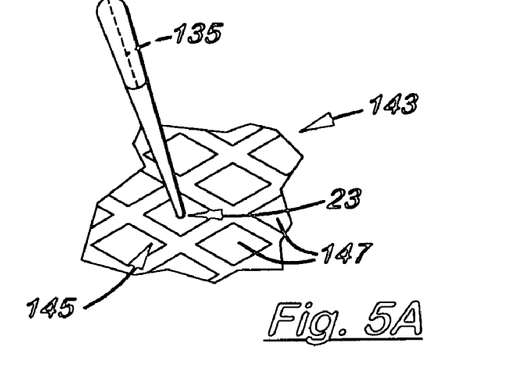
FIGS. 5A and 5B schematically show a pointing-type input devices according to embodiments of the present invention.

An embodiment of a pointing device 143 is seen in FIG. 5A. In the pointing device 143, a plurality of RF transponders 123 includes an array 145 of integrated circuits 147 and an antenna 135 that is moved relative to the array into and out of electrical contact with contacts of the circuits. The antenna 135 can be part of a stylus. Signals are transmitted when the antenna 135 makes electrical contact with any one of the circuits 147. Transmission of a given signal can be displayed as, for example, a cursor point on the display. Transmission of multiple signals can be displayed as, for example, one or more lines, such as lines in the form of a letter or number or other graphical symbol.

Figure 5B:
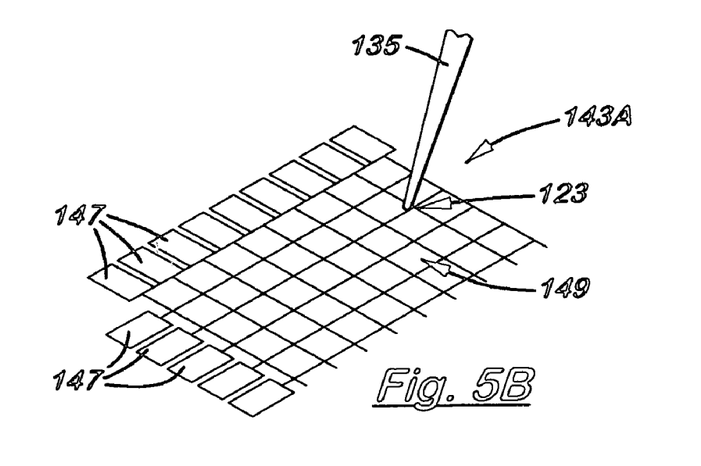

As seen in FIG. 5B, an array of integrated circuits may include a wire grid 149 electrically connected to integrated circuit chips 147 in another form of pointing device 143a. The antenna 135 can contact the wire grid 149 to cause signals to be transmitted, such as by transmitting a signal every time the antenna 135 in a stylus contacts one of the wires in the grid.

Figure 6:
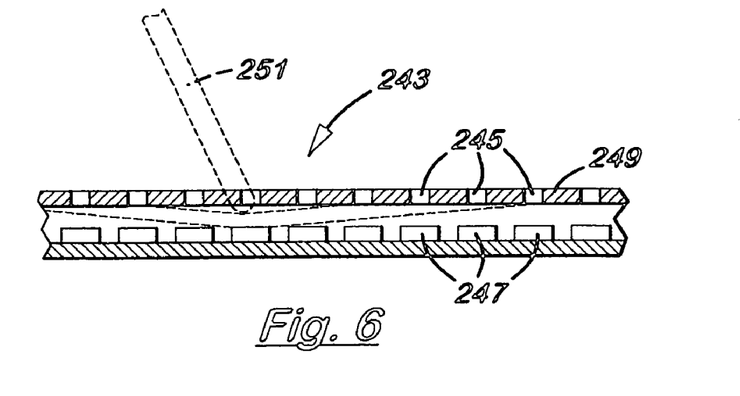
FIG. 6 schematically shows a pointing-type input device according to another embodiment of the present invention.

Another embodiment of a pointing device 243 is seen in FIG. 6. In the pointing device 243, a plurality of RF transponders includes an array of antennas 245 disposed in a first plane and an array of integrated circuits 247 disposed in a second plane. Each antenna 245 is movable upon application of a force to the antenna to contact a corresponding one of the integrated circuits 247 and transmit a corresponding signal. Upon removal of the force, the antenna 245 is removed from contact with the integrated circuit 247. The antennas 245 can be moved toward and away from the integrated circuits 247 in any suitable manner, such as by spring loading the antennas or fixing them to a flexible material such as a sheet 249. Upon moving a stylus 251 over the antennas 245 on the sheet 249, the sheet flexes sufficiently to bring the antennas contacted by the stylus into contact with corresponding integrated circuits. Transmission of a given signal can be displayed as, for example, a cursor point on the display. Transmission of multiple signals can be displayed as, for example, one or more lines, such as lines in the form of a letter or number or other graphical symbol.

Figure 7:
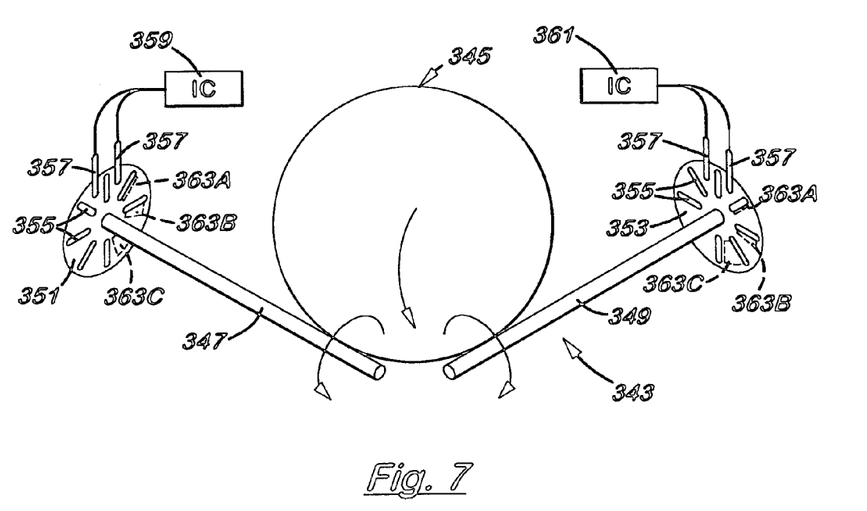
FIG. 7 schematically shows a mouse type input device according to further embodiments of the present invention.

FIG. 7 shows an embodiment of a pointing device 343 that is believed to have particular applicability in mice or tracking ball type pointing devices. As in a typical mechanical mouse type of device, a ball 345 protruding from an underside of the device 343 turns in the direction of movement. As the ball 345 rotates, it turns rollers 347 and 349 mounted perpendicularly to one another.

Wheels 351 and 353 similar to encoders in conventional mechanical mice are mounted to each roller 347 and 349, respectively. Each wheel 351 and 353 has a plurality of antennas 355 mounted on it. Contact bars 357 are disposed relative to the wheels to contact individual ones of the antennas 355 as the wheels 351 and 353 are rotated. The contact bars 357 lead to integrated circuits 359 and 361. Each time an antenna 355 contacts a contact bar, a signal is transmitted to a computing arrangement. Each signal corresponds to movement of the ball a known distance, which corresponds to movement of the pointing device such as a mouse.

Signals corresponding to the rotational direction of the ball 345, i.e., clockwise or counterclockwise, can be transmitted in any suitable manner. For example, signals corresponding to the direction of the turning of the ball 345 can be transmitted in a manner similar to transmission of signals corresponding to the distance of movement of the ball. For example, as seen in FIG.7, the signals can be transmitted by arranging antennas 363a, 363b, and 363c of different length on wheels 365 and 367 on the rollers 347 and 349, respectively. When the ball 345 is moved to turn the toilets 347 and 349, the antennas 363a, 363b, 363c touch contact bars 357 connected to integrated circuits 359 and 361 and signals of different durations corresponding to the different lengths of the antennas are transmitted. The computing arrangement can be arranged to interpret sequences of signals of different durations as movement of the ball 34S in a particular direction. The signals corresponding to the distance of movement of the ball 345 and the signals corresponding to the rotational direction of the ball can be decoded by the computing arrangement and displayed on a display as, for example, movement of a cursor, drawing of a line, etcetera, as in conventional mice or tracking balls.

Another possible arrangement includes a plurality of antennas 355, which may be the same size, disposed on wheels 365 and 367. First and second contact bars 357 are connected to respective first and second pairs of integrated circuits. The order in which the integrated circuit pairs are activated will correspond to the direction of movement of the cursor. The rate at which the pairs are activated indicates rates of movement in a direction of the cursor. The differential rate between pairs indicates the relative rate and direction in each axis.

Figure 8:
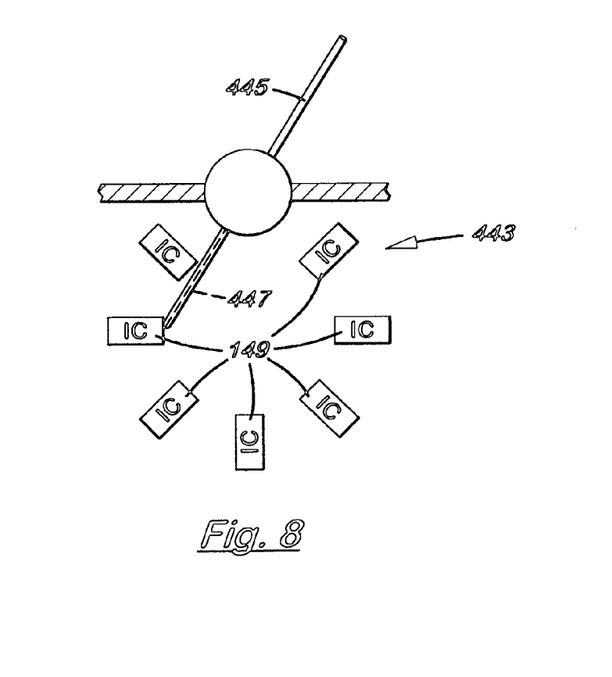
FIG. 8 schematically shows a stick-type input device according to another embodiment of the present invention.

Another embodiment of a pointing device 443 that is believed to have particular applicability to joy stick and pointing stick types of devices is shown in FIG. 8. As in typical pointing stick types of devices, a stick 445 is pivotably mounted on the pointing device 443 in any suitable manner, such as by being supported in a yoke or by means of a ball and socket type of structure. Pivoting of the stick 445 causes an antenna 447 to connect with and disconnect from one or more integrated circuits 449. The antenna 447 can be mounted in the stick 445. Signals transmitted by the integrated circuit or circuits 449 contacted by the antenna 447 are received and decoded by the computing arrangement and displayed on a display as, for example, movement of a cursor, drawing of a line, etcetera, as in conventional pointing sticks or joy sticks.

While this invention has been illustrated and described in accordance with a preferred embodiment, it is recognized that variations and changes may be made therein without departing from the invention as set forth in the claims.

What is claimed is:

1. A computer having at least one input device, comprising:
    an input device including at least one RF transponder that is controllable by a user to be selectively capable or incapable of transmitting a signal;
    a computing arrangement including a reader and a microprocessor, the computing arrangement being adapted to receive and decode the signal from the at least one RF transponder; and
    a display adapted to display information represented by the signal;
    wherein the at least one RF transponder is controlled to be capable of transmitting the signal by exposing an antenna and is controlled to be incapable of transmitting the signal by shielding the antenna.

2. The computer as set forth in claim 1, wherein the at least one RF transponder is configured as part of an RFID device.

3. The computer as set forth in claim 1, wherein the input device includes a keypad having a plurality of keys.

4. The computer as set forth in claim 3, wherein the keypad is arranged such that, when one of the plurality of keys is depressed, an antenna is caused to connect with a corresponding integrated circuit and send a signal.

5. The computer as set forth in claim 1, wherein the input device includes a pointing device.

6. The computer as set forth in claim 1, wherein the computer is adapted to be connected by wires to one or more wired input devices adapted to perform the same function as the input device.

7. The computer as set forth in claim 1, wherein the input device is adapted to communicate via wiring to the computing arrangement and to be disconnected from the wiring and communicate via the at least one RF transponder.

8. The computer as set forth in claim 1, wherein the computing arrangement causes status information pertaining to the input device on the display.

9. The computer as set forth in claim 1, wherein the input device operates together with another RFID product.

10. The computer as set forth in claim 9, wherein the computing arrangement is adapted to receive and decode the signal from the at least one RF transponder only when the computing arrangement detects the presence of an authorized RFID tag.

11. The computer as set forth in claim 1, wherein the display is a monitor.

12. The computer as set forth in claim 1, whereto the display includes a printer.

13. A computer having at least one input device, comprising:
an input device including at least one RF transponder that is controllable by a user to be selectively capable or incapable of transmitting a signal;
a computing arrangement including a reader and a microprocessor, the computing arrangement being adapted to receive and decode the signal from the at least one RF transponder;
a display adapted to display information represented by the signal;
wherein the input device includes a keypad having a plurality of keys;
wherein the keypad is arranged such that, when one of the plurality of keys is depressed, an antenna is caused to connect with a corresponding integrated circuit and send a signal; and
wherein depression of selected combinations of keys simultaneously sends a different signal than depression of the same keys individually.

14. The computer as set forth in claim 13, wherein the computing arrangement is arranged such that depression of a selected sequence of keys within a predetermined period of time is decoded differently than if the sequence of keys is not depressed within the predetermined period of time.

15. The computer as set forth in claim 13, wherein the at least one RF transponder is configured as part of an RFID device.

16. The computer as set forth in claim 13, wherein the input device includes a pointing device.

17. The computer as set forth in claim 13, wherein the input device operates together with another RFID product.

18. A computer having at least one input device, comprising:
an input device including at least one RF transponder that is controllable by a user to be selectively capable or incapable of transmitting a signal;
a computing arrangement including a reader and a microprocessor, the computing arrangement being adapted to receive and decode the signal from the at least one RF transponder;
a display adapted to display information represented by the signal;
wherein the input device includes a keypad having a plurality of keys;
wherein the keypad is arranged such that, when one of the plurality of keys is depressed, an antenna is caused to connect with a corresponding integrated circuit and send a signal; and
wherein the computing arrangement is arranged such that depression of a selected sequence of keys within a predetermined period of time is decoded differently than if the sequence of keys is not depressed within the predetermined period of time.

19. The computer as set forth in claim 18, wherein the at least one RF transponder is configured as part of an RFID device.

20. The computer as set forth in claim 18, wherein the input device includes a pointing device.

21. The computer as set forth in claim 18, wherein the input device operates together with another RFID product.

22. A computer having at least one input device, comprising:
an input device including at least one RF transponder that is configured as part of an RFID device, the at least one RF transponder being controllable by a user to be selectively capable or incapable of transmitting a signal;
a computing arrangement including a reader and a microprocessor, the computing arrangement being adapted to receive and decode the signal from the at least one RF transponder;
wherein the input device includes a pointing device;
wherein the at least one RF transponder includes an array of antennas disposed in a first plane and an array of integrated circuits disposed in a second plane, each antenna being movable upon application of a force to the antenna to contact a corresponding one of the integrated circuits and transmit a corresponding signal and, upon removal of the force, to be removed from contact with the one of the integrated circuits.

23. The computer as set forth in claim 22, wherein the antennas are disposed on a flexible material.

24. The computer as set forth in claim 23, wherein the flexible material is a sheet material.

25. The computer as set forth in claim 22, comprising a stylus for moving the antennas.

26. The computer as set forth in claim 22, wherein the at least one RF transponder includes a plurality of RF transponders.

27. The computer as set forth in claim 22, wherein the input device operates together with another RFID product.

28. The computer as set forth in claim 27, wherein the computing arrangement is adapted to receive and decode the signal from the at least one RF transponder only when the computing arrangement detects the presence of an authorized RFID tag.

29. A computer input device, comprising:
an input device including at least one RF transponder that is configured as part of an RFID device, the at least one RF transponder being controllable by a user to be selectively capable or incapable of transmitting a signal,
wherein the input device is adapted to cooperate with a computing arrangement including a reader and a microprocessor, the computing arrangement being adapted to receive and decode the signal from the at least one RF transponder, and wherein the input device includes a pointing device; and
wherein the at least one RF transponder includes an array of integrated circuits and an antenna that is moved over the array to cause signals to be transmitted.

30. The computer input device as set forth in claim 20, wherein the antenna is part of a stylus.

31. The computer as set forth in claim 29, wherein the array of integrated circuits includes a wire grid connected to a plurality of integrated circuit chips, the antenna contacting the wire grid to cause signals to be transmitted.

32. The computer input device as set forth in claim 29, wherein the at least one RF transponder includes a plurality of RF transponders.

33. A computer input device comprising:
an input device including at least one RF transponder that is configured as part of an RFID device, the at least one RF transponder being controllable by a user to be selectively capable or incapable of transmitting a signal,
wherein the input device is adapted to cooperate with a computing arrangement including a reader and a microprocessor, the computing arrangement being adapted to receive and decode the signal from the at least one RF transponder, and wherein the input device includes a pointing device; and
wherein the at least one RF transponder includes a plurality of antennas and a rotatable member, and wherein rotation of the rotatable member causes the antennas to connect with and disconnect from one or more integrated circuits.

34. A computer input device comprising:
an input device including at least one RF transponder that is configured as part of an RFID device, the at least one RF transponder being controllable by a user to be selectively capable or incapable of transmitting a signal,
wherein the input device is adapted to cooperate with a computing arrangement including a reader and a microprocessor, the computing arrangement being adapted to receive and decode the signal from the at least one RF transponder, and wherein the input device includes a pointing device; and
wherein the at least one RF transponder includes at least one antenna and a pivotable member, and wherein pivoting movement of the pivotable member causes the at least one antenna to connect with and disconnect from one or more integrated circuits.

* * * * *